(12) United States Patent
Kismarton et al.

(10) Patent No.: US 7,938,362 B2
(45) Date of Patent: May 10, 2011

(54) AIRPLANE FLOOR ASSEMBLY

(75) Inventors: Max U. Kismarton, Renton, WA (US);
Willard N. Westre, Bellevue, WA (US);
Stuart M. Buchan, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 714 days.

(21) Appl. No.: 11/358,503

(22) Filed: Feb. 21, 2006

(65) Prior Publication Data

US 2007/0194175 A1    Aug. 23, 2007

(51) Int. Cl.
*B64C 1/00* (2006.01)
*B64C 30/00* (2006.01)

(52) U.S. Cl. .................................. 244/117 R
(58) Field of Classification Search ............. 244/117 R, 244/118.5, 119, 133
See application file for complete search history.

(56) References Cited

U.S. PATENT DOCUMENTS

| | | | |
|---|---|---|---|
| 3,381,921 A | 5/1968 | McDonough | |
| 3,612,316 A | 10/1971 | Brenner et al. | |
| 5,992,112 A * | 11/1999 | Josey | 52/309.8 |
| 6,497,388 B1 | 12/2002 | Friend et al. | |
| 6,572,054 B1 | 6/2003 | Smallhorn | |
| 6,585,189 B1 | 7/2003 | Smallhorn | |
| 6,824,104 B2 | 11/2004 | Smallhorn | |
| 6,863,344 B2 | 3/2005 | Smallhorn | |
| 2006/0054741 A1 * | 3/2006 | Mills et al. | 244/118.5 |
| 2006/0231681 A1 * | 10/2006 | Huber et al. | 244/119 |

FOREIGN PATENT DOCUMENTS

| | | |
|---|---|---|
| DE | 20122116 | 6/2004 |
| DE | 2162042 | 9/2007 |
| WO | WO2005012085 | 2/2005 |

OTHER PUBLICATIONS

U.S. Appl. No. 11/086,307, filed Mar. 23, 2005 entitled "Integrated Aircraft Structural Floor".

* cited by examiner

*Primary Examiner* — Timothy D Collins
*Assistant Examiner* — Valentina Xavier
(74) *Attorney, Agent, or Firm* — Tung & Associates

(57) ABSTRACT

The invention relates to airplane floor assemblies and to methods for their assembly. In one embodiment, an airplane comprises at least one fuselage section and at least one floor section. At least one system component is installed to the floor section prior to installation of the floor section in the fuselage of the airplane. In another embodiment, a floor section adapted to be installed in an airplane includes at least one system component installed to the floor section while it is outside of the airplane. In yet another embodiment, a method is disclosed for assembling an airplane. The method comprises installing at least one system component to a floor section, and installing the floor section into a fuselage section of the airplane.

36 Claims, 7 Drawing Sheets

US 7,938,362 B2

AIRPLANE FLOOR ASSEMBLY

BACKGROUND OF THE INVENTION

Many of the present airplanes store systems components, such as electrical boxes, wiring, ducting, and other components, in cargo bays within the airplane. The cargo bays may take up a large amount of space within the airplane. The systems components are often installed into airplanes by having maintenance workers install the systems components while in tight areas within the cargo bays of the airplane. This installation process may be difficult, timely, expensive, require many parts, lead to worker fatigue and injury, and require systems components to be concentrated in areas of the airplane thereby making the components more susceptible to damage. An airplane, floor section, and/or method for assembling an airplane is needed which may solve one or more problems of one or more present airplanes.

SUMMARY OF THE INVENTION

In one aspect of the invention, an airplane comprises at least one fuselage section and at least one floor section. The floor section has at least one system component installed to the floor section prior to installation of the floor section in the fuselage section.

In another aspect of the invention, a floor section adapted to be installed in an airplane includes at least one system component installed to the floor section while the floor section was outside of the airplane.

In a further aspect of the invention, a method is disclosed for assembling an airplane. The method comprises installing at least one system component to a floor section, and installing the floor section into a fuselage section of the airplane.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
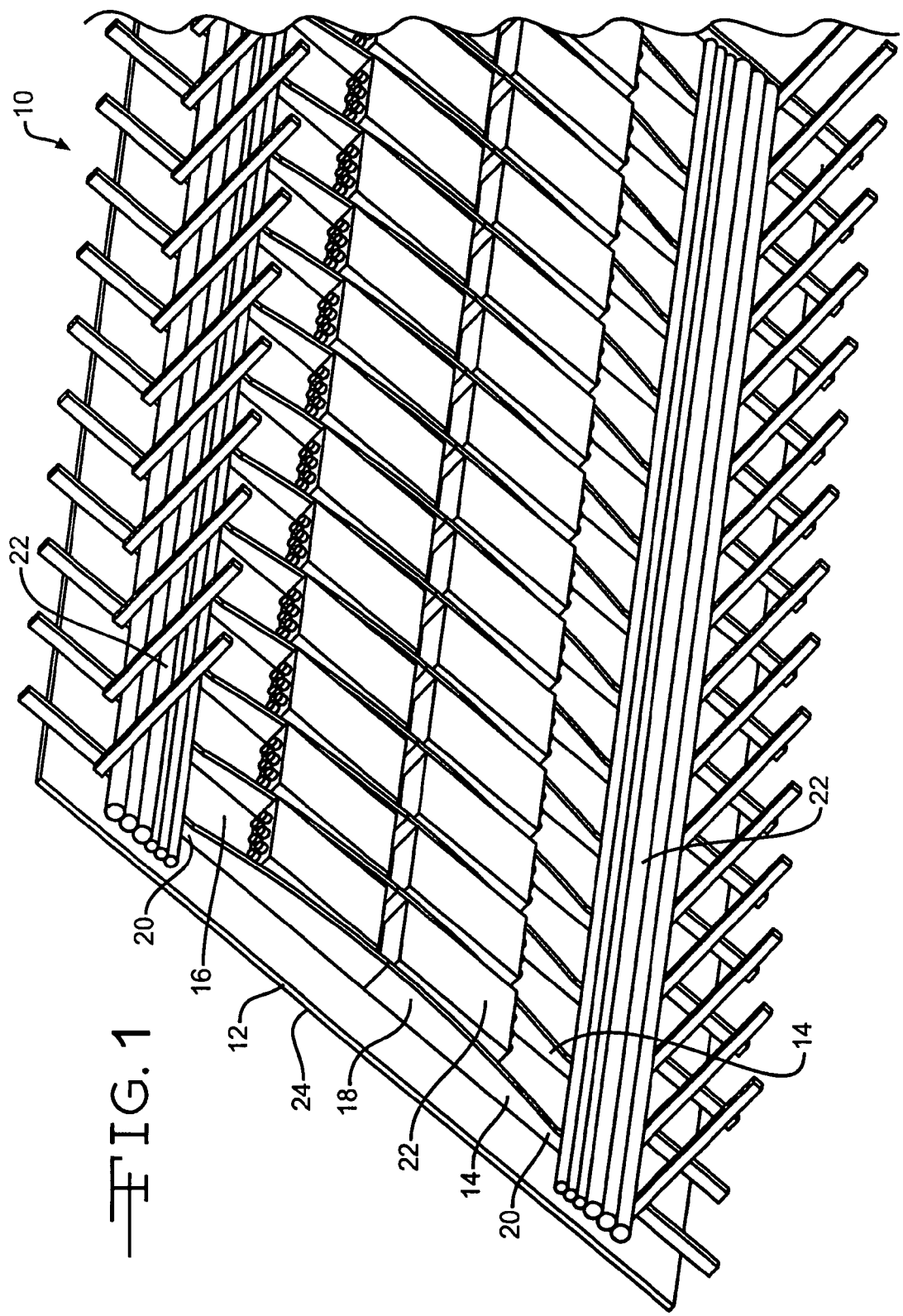
FIG. 1 is a perspective view of one embodiment of a floor section under the invention.

As shown in FIG. 1, in one embodiment of the invention a floor section 10 may be provided which is adapted to be installed into an airplane. The floor section 10 may be an integrated one-piece section, and may be at least 20 feet wide and 60 feet long. In other embodiments, the floor section may be of any type, size, shape, orientation, and/or configuration. The floor section 10 may include a floor 12, and integrated spaced apart beams 14 extending over at least a portion of bottom portion 16 of floor section 10. Bottom portion 16 of floor section 10 is defined as the portion of floor section 10 below floor 12. The integrated spaced apart beams 14 may extend substantially perpendicular to the floor 12. The beams 14 may be thickest in their center portion 18 and may taper so that they are thinnest at their side portions 20. At least one system component 22 may be installed to the floor section 10. The system component 22 may comprise one or more of a flight control, a seat, an instrument panel, an electronic box, a duct, and/or a wire.

In one embodiment, one or more system components 22 may be installed to and/or in a bottom portion 16 of the floor section 10 between two floor beams 14. Preferably, the electronic boxes, ducts, and wires are installed in the bottom portion 16 of the floor section 10 between floor beams 14. In another embodiment, one or more system components may be installed to a top portion 24 of the floor section 10. Top portion 24 of floor section 10 is defined as the portion of floor section 10 above floor 12. Preferably, the flight control and seats are attached to the top portion 24 of the floor section 10. The system components 22 may be installed to the floor section 10 while the floor section 10 is outside of the airplane. In other embodiments, any number of system components 22 may be installed in any location, configuration, or orientation to any portion of the floor section 10. Preferably, a multitude of system components 22 are distributed throughout the floor section 10 to protect as many components 22 as possible in the event of damage occurring in one area of the airplane.

Figure 2:
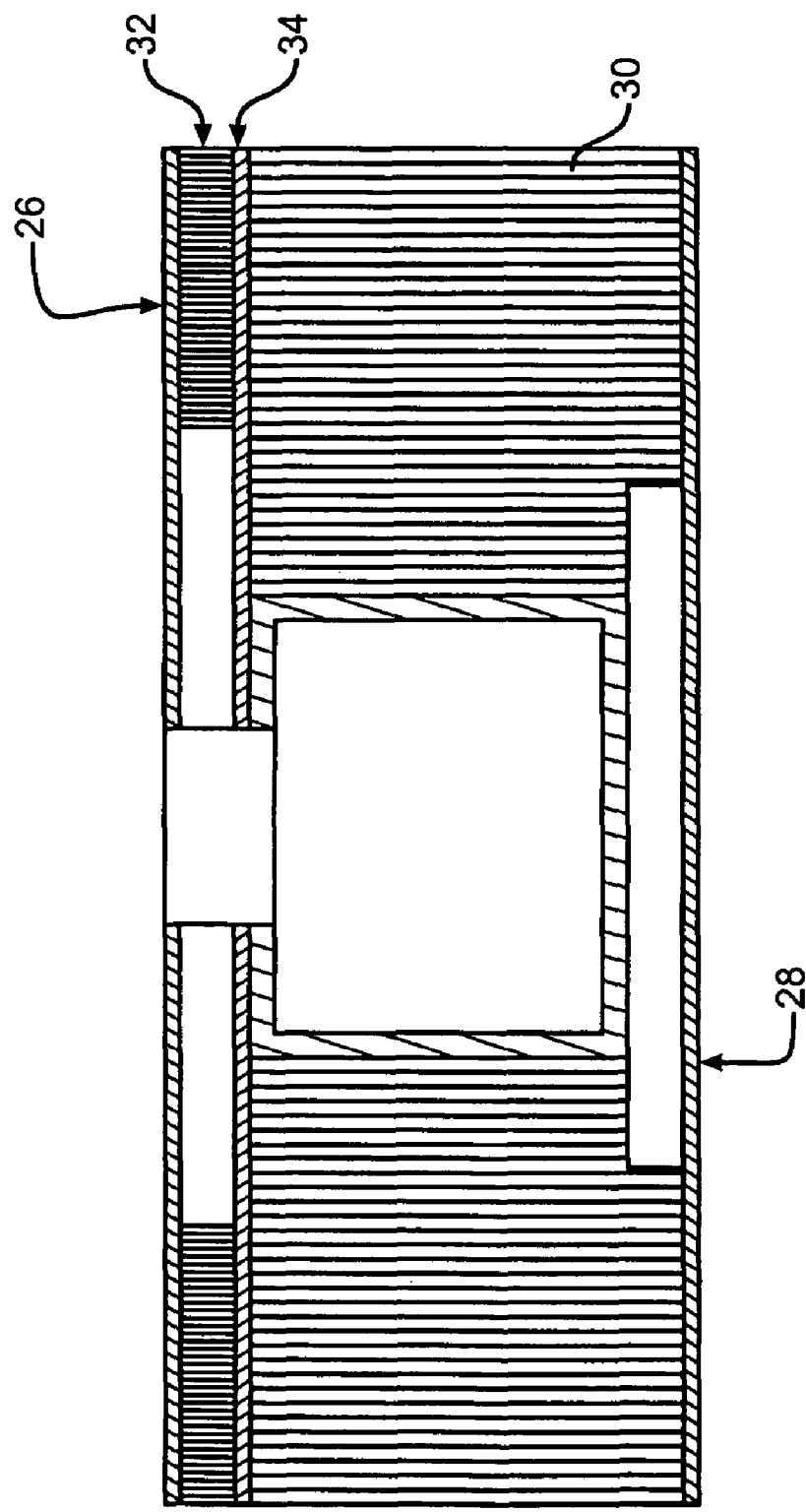
FIG. 2 is a cross-sectional view of an embodiment of a composite floor incorporated under the invention.

U.S. patent application Ser. No. 11/086,307, filed on Mar. 23, 2005, entitled Integrated Aircraft Structural Floor is hereby incorporated by reference in full. The floor 12 of the floor section 10 of the instant invention may comprise any embodiment of the integrated aircraft structural floor disclosed in U.S. patent application Ser. No. 11/086,307. For instance, as depicted in FIG. 2, the floor 12 of the floor section 10 may comprise a composite consisting of a top-layer skin 26, a bottom layer skin 28 disposed below the top-layer skin 26, and a first structural core 30 disposed between the top-layer skin 26 and the bottom layer skin 28. The first structural core 30 may be low-density, and a second high-density core 32 may be affixed to the low-density core 30 via septum 34. The first and or second structural cores, 30 and 32, may comprise honeycomb composite materials.

Figure 3:
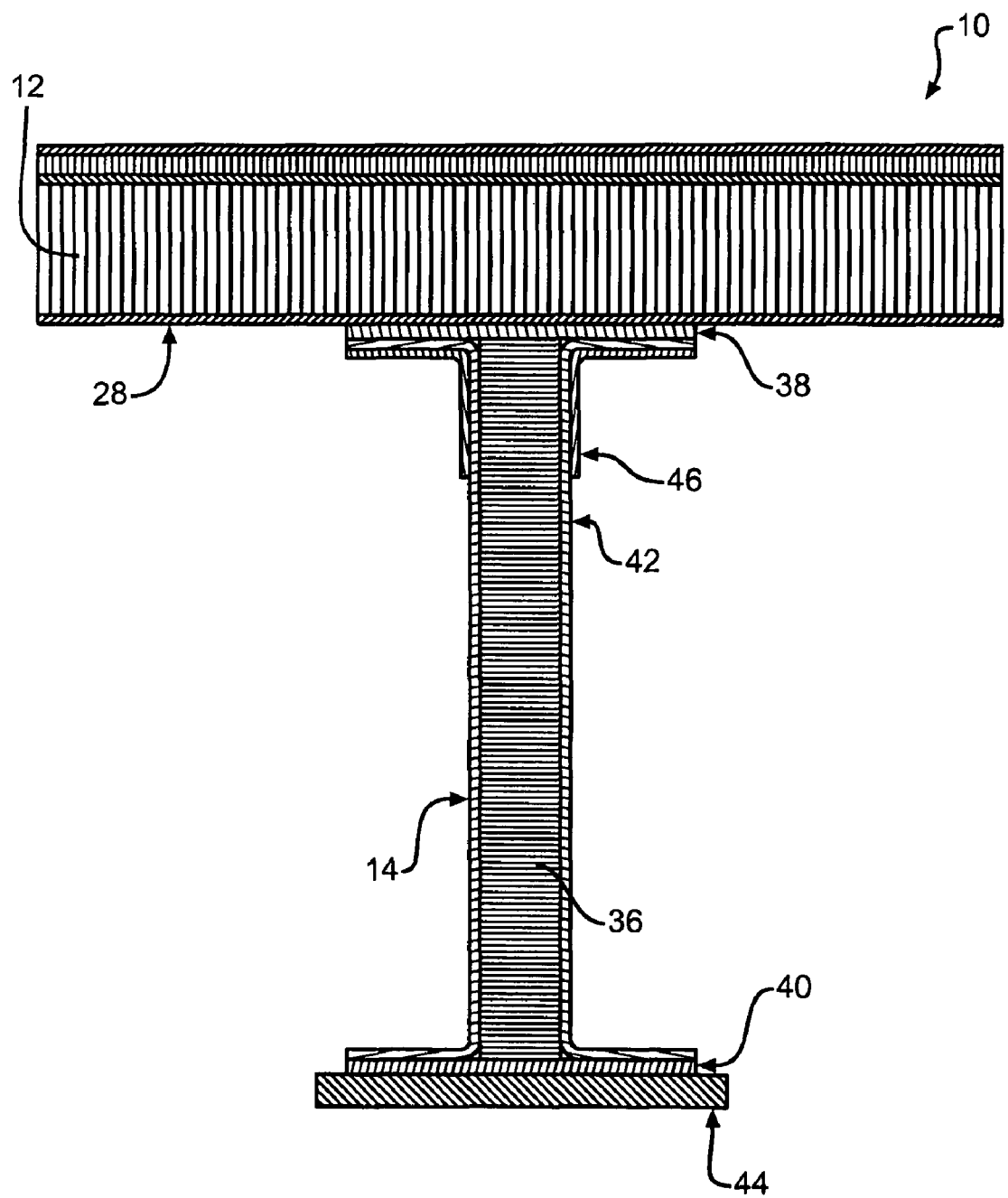
FIG. 3 is a cross-sectional view of an embodiment of a composite floor beam incorporated under the invention.

The floor 12 of the floor section 10 may be made of any of the materials disclosed in U.S. patent application Ser. No. 11/086,307. As depicted in FIG. 3, the spaced apart beams 14 may be attached to the bottom layer skin 28 of the floor 12 of floor section 10, and the beams 14 may extend across a width of the floor section 10. Each beam 14 may comprise a central core 36, an upper cap 38, a lower cap 40, a left and right web 42, a lower reinforcing cap 44, and a left and right doubler 46. In other embodiments, the beams 14 may comprise any embodiment of the beams disclosed in U.S. patent application Ser. No. 11/086,307.

Figure 4:
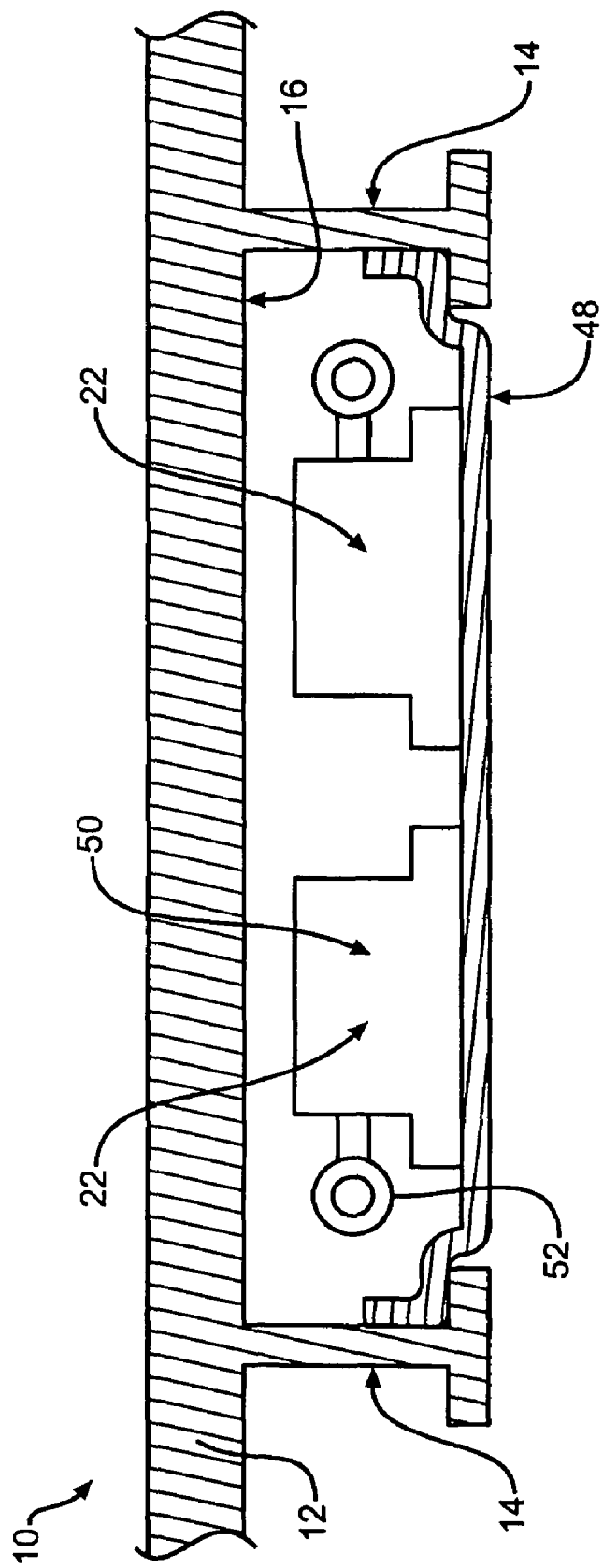
FIG. 4 is a partial cross-sectional view of one embodiment of a bottom portion of a floor section under the invention.

FIG. 4 depicts one embodiment of system components 22 disposed below floor 12 of floor section 10. As shown, the system components 22 may be disposed below the bottom portion 16 of the floor section 10 below floor 12, between beams 14, and above one or more doors 48. The system components 22 may be installed directly to door 48 or may be installed to the beams 14 or to another part of the floor section 10 such as the bottom portion 16. In other embodiments, the system components 22 may be installed to one or more members extending substantially perpendicular to the floor section 10. Installation of the system components 22 may be accomplished utilizing any mechanism known in the art, such as bolts, brackets, snap-fits, clips, hinges, and/or adhesive. Door 48 may be attached between beams 14 using one or more hinges, brackets, bolts, or clips to allow access to the system components from below the bottom portion 16 of the floor section 10. In such manner, when the floor section 10 is installed on an airplane a maintenance worker may access the system components from below the floor section 10. As shown, the system components 22 may comprise electrical boxes 50 and wires 52 running from the electrical boxes 50. In other embodiments, other system components 22 known in the art may be utilized.

In another embodiment, the invention may comprise an airplane including at least one fuselage section and at least one floor section 10. The fuselage section of the airplane may comprise a shell of the airplane. The fuselage section may have a height greater than a width of the fuselage section to allow the installation of the floor section 10 into the fuselage section. The floor section 10 may be attached to the fuselage section of the airplane utilizing any mechanism known in the art such as bolts, brackets, snap-fits, clips, hinges, and/or adhesive. The floor section 10 may comprise any of the embodiments of the floor section 10 disclosed herein. The floor section 10 may have at least one system component 22 installed to the floor section 10 prior to the installation of the floor section 10 into the fuselage section.

The system component 22 may have been installed to the floor section 10 while the floor section 10 was outside of the fuselage section utilizing a work-station located outside of the airplane. The floor section 10 of the airplane may have been rotated into one or more positions while outside of the airplane in order to install the system component 22 to the floor section 10 while outside of the airplane. The floor section 10 may have been installed into the fuselage section by orienting the floor section 10 substantially vertically within the fuselage section, and then rotating the floor section 10 into a substantially horizontal position within the fuselage section. In other embodiments, the floor section 10 may have been installed into the fuselage section utilizing varying mechanisms. The airplane may include three floor sections 10, which may be distributed throughout forward, middle, and aft portions of the airplane. In other embodiments, any number of floor sections may be utilized in any size, configuration, location, and/or orientation.

Figure 5:
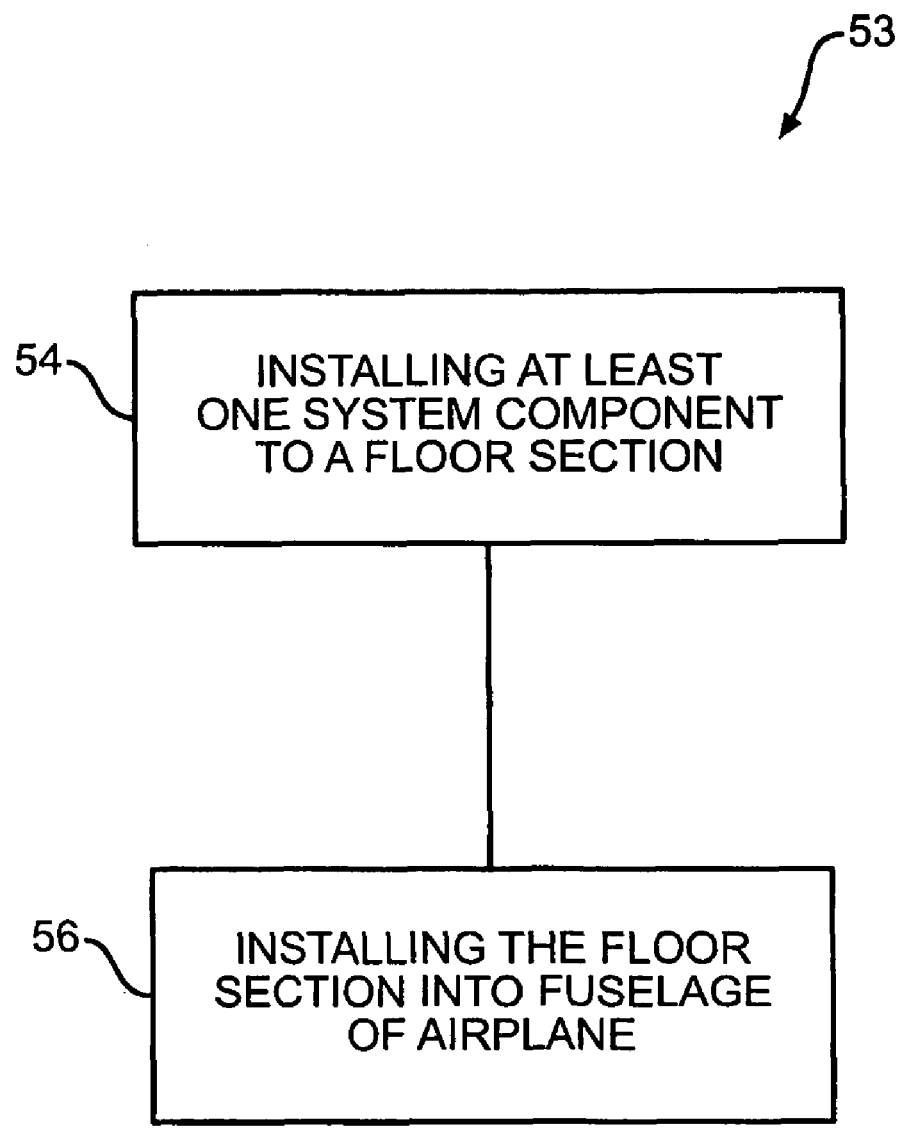
FIG. 5 depicts one embodiment of a method for assembling an airplane under the invention.

FIG. 5 depicts one embodiment 53 of a method for assembling an airplane under the invention. In step 54, at least one system component may be installed to a floor section. The system component may be installed to a bottom portion of the floor section between two floor beams. A plurality of system components may be installed throughout the floor section. Equipment, wiring, and electronic boxes may be installed to the floor section, in sequential order. In other embodiments, any order and types of system components may be utilized. The system components and floor section may comprise any of the embodiments disclosed herein.

Figure 6:
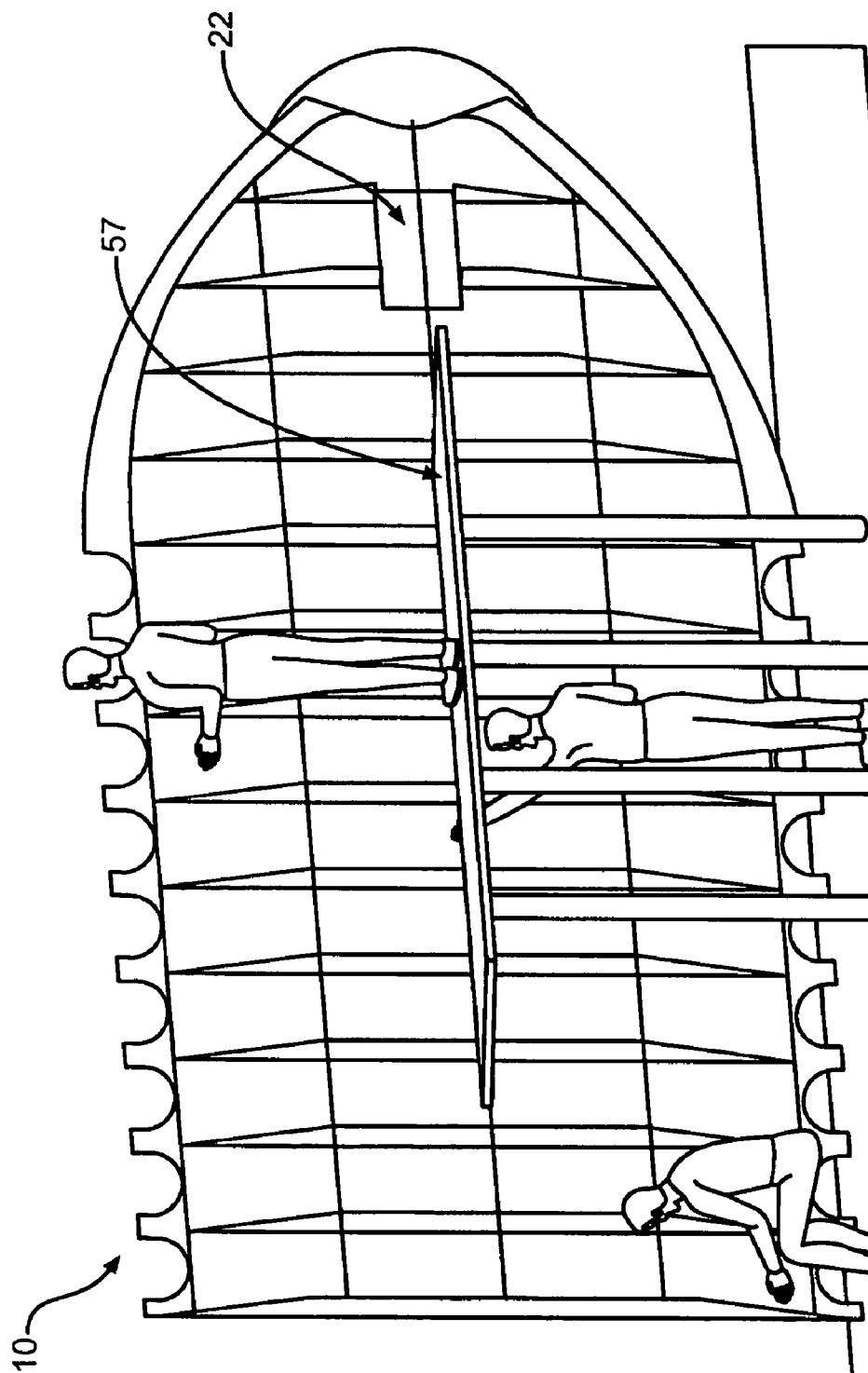
FIG. 6 is a front view showing one embodiment of system components being installed to a floor section under the invention using a work-station outside of the airplane.

As shown in FIG. 6, one or more workstations 57 outside of the airplane may be utilized to install the system components 22 to the floor section 10. Installing the system components 22 to the floor section 10 outside of the airplane may allow the floor section 10 to be rotated into one or more positions while outside of the airplane to make it less difficult to install the system components 22. For instance, while the floor section 10 is located outside of the airplane the floor section 10 may be rotated into a substantially horizontal position to allow attachment of the large equipment, such as the flight controls and seats, to the floor section 10. The floor section 10 may then be rotated into a substantially vertical position to allow maintenance workers to have access to install the electronic boxes and wiring. In other embodiments, any number of mechanisms and configurations may be utilized.

Figure 7:
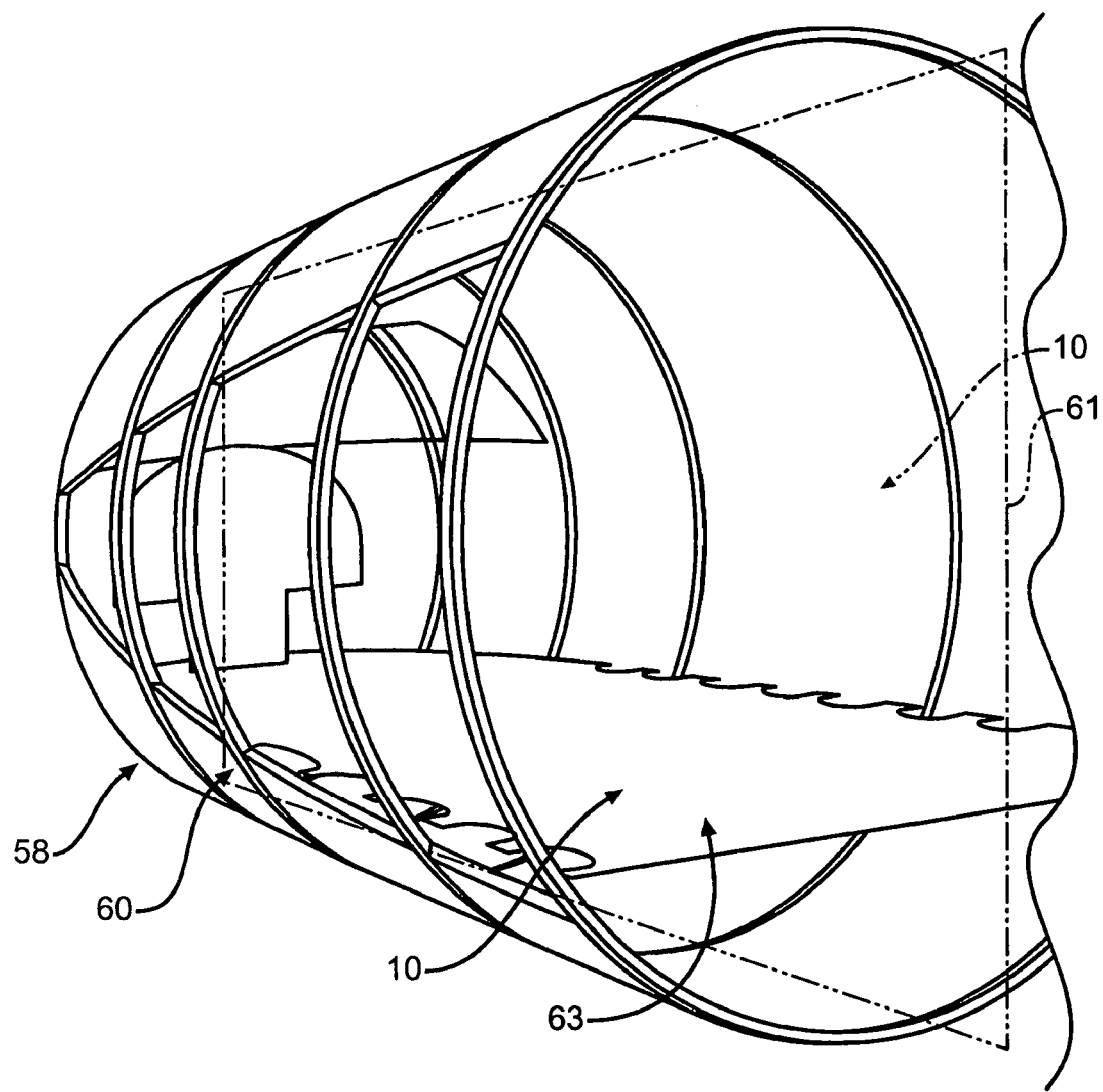
FIG. 7 is a partial perspective view showing one embodiment of the assembly of a floor section into the fuselage of an airplane.

In step 56 of the method depicted in FIG. 5, the floor section may be installed into a fuselage section of the airplane. The fuselage section of the airplane may have a height which is greater than a width of the fuselage section to allow the floor section to be installed into the fuselage section. As shown in FIG. 7, the floor section 10 may be installed into the fuselage section 60 of the airplane 58 by orienting the floor section 10 substantially vertically within the fuselage section 60 into position 61 and then rotating the floor section 10 into substantially horizontal position 63 within the fuselage section 60. During installation, the floor section 10 may be bolted to the fuselage section 60. In other embodiments, any mechanism known in the art may be used to attach the floor section 10 to the fuselage section 60. Three floor sections 10 may be installed into the fuselage section 60. In other embodiments, any number of floor sections 10 may be installed. The step of installing the system components 22 to the floor section 10 may occur prior to the step of installing the floor section 10 into a fuselage section 60 of the airplane.

The present invention may allow airplanes to be built less expensively, more efficiently, more timely, with less difficulty, with less required parts, and/or with more cargo space. The invention may allow maintenance workers to gain access to system components of the airplane. The invention may also reduce the risk that damage to one portion of the airplane will necessarily damage all system components. There also may be other benefits of the invention.

It should be understood, of course, that the foregoing relates to exemplary embodiments of the invention and that modifications may be made without departing from the spirit and scope of the invention as set forth in the following claims.

We claim:

1. A method for assembling an airplane comprising:
    installing at least one system component to a floor section; and
    installing the floor section into a fuselage section of said airplane;
    said floor section installed such that said at least one system component is capable of being accessed by a worker positioned below said floor section, said access provided from underneath at least one door attached in a bottom portion of said floor section, said bottom portion of said floor section below a top portion of the floor section comprising said floor section, said at least one system component above said at least one door.

2. The method of claim 1 wherein the step of installing said system component to said floor section takes place before the step of installing the floor section into a fuselage section of said airplane.

3. The method of claim 1 wherein the step of installing the floor section into a fuselage section comprises installing three floor sections into said fuselage section of said airplane.

4. The method of claim 1 wherein said system component comprises at least one of a flight control, a seat, an instrument panel, an electronic box, a duct, and a wire.

5. The method of claim 1 wherein the step of installing at least one system component to a floor section is accomplished using a work-station outside of the airplane.

6. The method of claim 1 wherein during the step of installing at least one system component to a floor section, said floor section is rotated into one or more positions outside of said airplane to install said system component to said floor section outside of said airplane.

7. The method of claim 1 wherein a height of said fuselage section is greater than a width of said fuselage section to allow said floor section to be installed into said fuselage section.

8. The method of claim 1 wherein the step of installing the floor section into a fuselage section of said airplane comprises orienting said floor section substantially vertically within said fuselage section and then rotating said floor section into a substantially horizontal position within said fuselage section.

9. The method of claim 1 wherein the step of installing at least one system component to a floor section comprises installing at least one system component in said bottom portion of said floor section.

10. The method of claim 1 wherein the step of installing at least one system component to a floor section comprises installing at least one system component between two floor beams in said bottom portion of said floor section.

11. The method of claim 1 wherein said floor section comprises a top-layer skin, a bottom layer skin disposed below the top-layer skin, and a first structural core disposed between the top-layer skin and the bottom layer skin.

12. The airplane of claim 11 wherein the first structural core comprises a honeycomb composite material.

13. The method of claim 1 wherein the step of installing the floor section into a fuselage section of said airplane comprises bolting said floor section to said fuselage section.

14. The method of claim 1 wherein the step of installing at least one system component to a floor section comprises installing a plurality of system components throughout said floor section.

15. The method of claim 1 wherein said floor section is at least 20 feet wide and 60 feet long.

16. The method of claim 1 wherein the step of installing at least one system component to a floor section comprises installing equipment to said floor section, installing wiring to said floor section, and installing boxes to said floor section.

17. The method of claim 1, wherein said system component is installed to said floor section using at least one of a bolt, a bracket, a hinge, and a clip.

18. The method of claim 1, further comprising the step of attaching flight control and seats to a top of said floor section before the step of installing the floor section into a fuselage section of said airplane.

19. A method for assembling an airplane comprising:
    installing at least one system component to a floor section; and
    installing the floor section into a fuselage section of said airplane;
    said floor section installed such that said at least one system component is capable of being accessed by a worker positioned below said floor section, said access provided from underneath at least one door attached in a bottom portion of said floor section, said bottom portion of said floor section below a top portion of the floor section comprising said floor section, said at least one system component above said at least one door;
    said installing the floor section comprising orienting said floor section substantially vertically within said fuselage section and then rotating said floor section into a substantially horizontal position within said fuselage section;
    accessing said at least one system component by said worker positioned below said floor section.

20. The method of claim 19 wherein the step of installing said system component to said floor section takes place before the step of installing the floor section into a fuselage section of said airplane.

21. The method of claim 19 wherein the step of installing the floor section into a fuselage section comprises installing three floor sections into said fuselage section of said airplane.

22. The method of claim 19 wherein said system component comprises at least one of a flight control, a seat, an instrument panel, an electronic box, a duct, and a wire.

23. The method of claim 19 wherein the step of installing at least one system component to a floor section is accomplished using a work-station outside of the airplane.

24. The method of claim 19 wherein during the step of installing at least one system component to a floor section, said floor section is rotated into one or more positions outside of said airplane to install said system component to said floor section outside of said airplane.

25. The method of claim 19 wherein a height of said fuselage section is greater than a width of said fuselage section to allow said floor section to be installed into said fuselage section.

26. The method of claim 19 wherein the step of installing at least one system component to a floor section comprises installing at least one system component in said bottom portion of said floor section.

27. The method of claim 19 wherein the step of installing at least one system component to a floor section comprises installing at least one system component between two floor beams in said bottom portion of said floor section.

28. The method of claim 19 wherein said floor section comprises a top-layer skin, a bottom layer skin disposed below the top-layer skin, and a first structural core disposed between the top-layer skin and the bottom layer skin.

29. The airplane of claim 28 wherein the first structural core comprises a honeycomb composite material.

30. The method of claim 19 wherein the step of installing the floor section into a fuselage section of said airplane comprises bolting said floor section to said fuselage section.

31. The method of claim 19 wherein the step of installing at least one system component to a floor section comprises installing a plurality of system components throughout said floor section.

32. The method of claim 19 wherein said floor section is at least 20 feet wide and 60 feet long.

33. The method of claim 19 wherein the step of installing at least one system component to a floor section comprises installing equipment to said floor section, installing wiring to said floor section, and installing boxes to said floor section.

34. The method of claim 19, wherein said system component is installed to said floor section using at least one of a bolt, a bracket, a hinge, and a clip.

35. The method of claim 19, further comprising the step of attaching flight control and seats to a top of said floor section before the step of installing the floor section into a fuselage section of said airplane.

36. A method for assembling an airplane comprising;
    installing at least one system component to a floor section; and
    installing the floor section into a fuselage section of said airplane;
    said floor section installed such that said at least one system component is capable of being accessed by a worker positioned below said floor section;
    wherein at least one door is attached in a bottom portion of said floor section to allow said accessing said system component from underneath said at least one door by said worker positioned below said floor section, said bottom portion of said floor section below a top portion of the floor section comprising said floor section, said at least one system component above said at least one door; said installing the floor section comprising orienting said floor section substantially vertically within said fuselage section and then rotating said floor section into a substantially horizontal position within said fuselage section.

* * * * *